United States Patent
Klein

(10) Patent No.: US 11,782,632 B2
(45) Date of Patent: Oct. 10, 2023

(54) SELECTIVE ERASURE OF DATA IN A SSD

(71) Applicant: Kioxia Corporation, Tokyo (JP)

(72) Inventor: Yaron Klein, Raanana (IL)

(73) Assignee: KIOXIA CORPORATION, Tokyo (JP)

(*) Notice: Subject to any disclaimer, the term of this patent is extended or adjusted under 35 U.S.C. 154(b) by 0 days.

(21) Appl. No.: 17/526,971

(22) Filed: Nov. 15, 2021

(65) Prior Publication Data

US 2022/0075548 A1 Mar. 10, 2022

Related U.S. Application Data

(63) Continuation of application No. 16/239,209, filed on Jan. 3, 2019, now Pat. No. 11,175,850.

(51) Int. Cl.
*G06F 12/00* (2006.01)
*G06F 3/06* (2006.01)
*G06F 12/1009* (2016.01)

(52) U.S. Cl.
CPC .......... *G06F 3/0652* (2013.01); *G06F 3/0604* (2013.01); *G06F 3/0673* (2013.01); *G06F 12/1009* (2013.01); *G06F 2212/1044* (2013.01); *G06F 2212/657* (2013.01)

(58) Field of Classification Search
CPC .... G06F 3/0652; G06F 3/0604; G06F 3/0673; G06F 12/1009; G06F 12/0238; G06F 12/0246; G06F 2212/7201; G06F 2212/7205

See application file for complete search history.

(56) References Cited

U.S. PATENT DOCUMENTS

| | | | |
|---|---|---|---|
| 9,558,112 B1 | 1/2017 | Borchers | |
| 2011/0161560 A1* | 6/2011 | Hutchison | G06F 12/0246 711/202 |
| 2014/0006689 A1 | 1/2014 | Hashimoto | |
| 2014/0047170 A1* | 2/2014 | Cohen | G06F 12/0246 711/103 |
| 2018/0196743 A1 | 7/2018 | McVay et al. | |

OTHER PUBLICATIONS

Final Office Action on U.S. Appl. No. 16/239,209 dated Mar. 22, 2021.
Final Office Action on U.S. Appl. No. 16/239,209 dated Jul. 2, 2020.
Non-Final Office Action on U.S. Appl. No. 16/239,209 dated Mar. 18, 2020.
Non-Final Office Action on U.S. Appl. No. 16/239,209 dated Nov. 6, 2020.
U.S. Notice of Allowance on U.S. Appl. No. 16/239,209 dated Jul. 21, 2021.

* cited by examiner

*Primary Examiner* — Shawn X Gu
(74) *Attorney, Agent, or Firm* — Foley & Lardner LLP

(57) ABSTRACT

Various implementations described herein relate to systems and methods for managing selective erasure in a Solid-State Drive (SSD) including receiving a selective erase command corresponding to erasing valid and invalid data mapped to a logical address and in response to receiving the selective erase command, erasing blocks in which one or more pages mapped to the logical address are located based on a mapping table that maps the logical address to the one or more pages. Both valid data and invalid data may be physically stored in one or more pages.

20 Claims, 4 Drawing Sheets

SELECTIVE ERASURE OF DATA IN A SSD

CROSS-REFERENCE TO RELATED APPLICATIONS

The present application is a continuation of U.S. patent application Ser. No. 16/239,209 filed Jan. 3, 2019, now U.S. Pat. No. 11,175,850, the contents of which are incorporated herein by reference in their entirety.

TECHNICAL FIELD

The present disclosure generally relates generally to systems and methods for providing selective erasure of data in Solid State Drives (SSDs).

BACKGROUND

A conventional Solid-State Drive (SSD) is configured to store data in a non-volatile storage device (e.g., NAND memory devices) by units referred to as "pages." A NAND memory device typically has multiple blocks, and each block has multiple pages. For a SSD, data is typically written page-by-page and erased block-by-block. Once written, pages may not be overwritten, except by first erasing the whole block. Therefore, with respect to updating data, responsive to receiving a write or update command to update data originally stored in a first page, a memory controller of the SSD writes the updated data to a second page different from the first page. The controller is configured to update an internal mapping (e.g., via a mapping table) to indicate that the updated data is stored in the second page (the new physical location). A host system writing data to the SSD uses a logical addressing scheme where the logical addresses, e.g. logical block addresses (LBAs), are mapped to the physical NAND memory device pages by a logical to physical mapping table. When the host over-writes or updates data at a given logical address, it is unaware that the original data is still stored in the first page and not actually physically over-written by the updated data, which is stored in a different, second page. The controller is also configured to consider the original data (the first page) as invalid, although the original data itself remains intact and readable within the first page.

Besides over-writing existing data at a logical address, a host system may also invalidate data at a logical address directly, using traditional commands according to various standards, such as, but not limited to, Trim (SATA standard), Deallocate (NVMe standard), and Unmap (SCSI standard) can be issued by an operating system (OS) or filesystem of the host to invalidate data at a logical address, or range of addresses, in an SSD. The original data in the physical pages mapped to by logical addresses still remains intact, as only the mapping is updated to indicate the pages are invalid.

Therefore, data associated with invalidated pages, herein referred to as 'ephemeral data', will remain intact until a garbage collection event occurs which selects for recycling the particular block where the data resides. If data at a logical address is updated or over-written multiple times, there may be multiple generations of ephemeral data associated with a logical address, located in multiple invalid pages in multiple blocks.

During a garbage collection event, the valid pages of a selected block are copied to new locations (i.e. new valid pages in new blocks). The selected block is then erased, causing any ephemeral data in the invalid pages to be erased. Since there may be an indeterminate time between a page being made invalid and the block in which it resides being erased, ephemeral data in a SSD may be available for inspection for an indeterminate length of time which is not under the control or influence of the host system which originally wrote the data.

For data security or privacy reasons, outdated data/information such as ephemeral data should be deleted to prevent unauthorized reading or inspection. Conventional erase functions available to a host either completely erase the whole drive or a single volume or namespace. Therefore, there remains a need to perform selective erasure of data, including ephemeral data, in a SSD.

SUMMARY

In certain aspects, the present implementations of a SSD device are directed to systems and methods for providing erasure of a data segment of the SSD device to prevent reading or recovery of current (valid) or historic (invalid) data.

DETAILED DESCRIPTION

Figure 1:
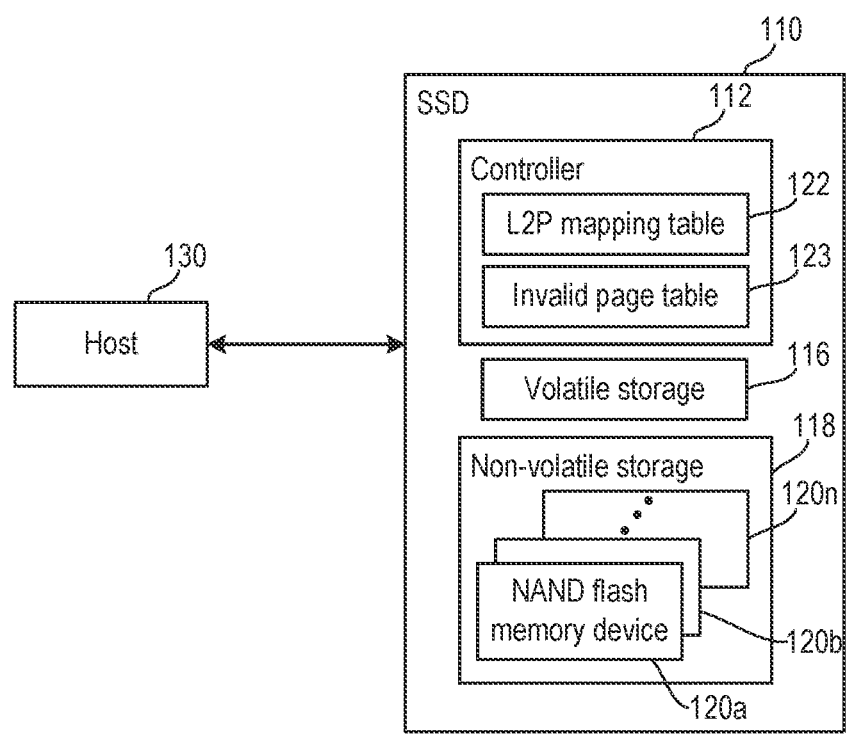
FIG. 1 shows a block diagram of examples of a host and an SSD device, according to some implementations.

Among other aspects, Applicant notes that a traditional filesystem may issue a command to a SSD to indicate that a logical address is no longer used, and as a response, the SSD controller updates a mapping table such that the pages associated with the logical address may be determined to be invalid and ready to be garbage-collected. The pages will be erased in a garbage collection cycle at a later time, whenever that may be. Applicant recognizes that traditional filesystems and OSs running on client or host computers do not have a command interface which allows traditional filesystems and OSs to request erasure of the storage medium (e.g., the NAND memory devices) for data of a particular logical address (e.g., a logical block address (LBA)) or a particular range of logical addresses (e.g., a range of LBAs). That is, traditional erase functions originally defined for hard disk drives (such as defined in the "Sanitize Device Feature Set" of ANSI ATA specification) erase all the user data on the whole drive, or perform direct over-writing of sectors of the hard disk, thereby erasing the data; while newer secure erase functions designed for SSDs (such as defined in namespace Format commands by the NVM Express specification) either erase user data on the whole drive or in individual volumes (namespaces). Hence, no traditional erase functions have been defined for a particular logical address or a particular range of logical addresses for erasing data in a SSD. As a result, invalid/outdated ephemeral data can exist in the storage medium for an indeterminate period of time.

Applicant further recognizes that while conventional erase functions are suitable for some applications (e.g., military applications for which data is deleted from SSDs of an unmanned aerial vehicle (UAV)), other applications can benefit from a selective erase function described herein. As used herein, "selective erase" refers to erasing data of (corresponding to) a particular logical address or a particular range of logical addresses from an SSD, including any ephemeral data corresponding to the logical addresses. That is, selective erase enables erasure of physical locations of the SSD responsive to a command, which is internally generated or received from a host system, that includes or otherwise identifies the particular logical address or the particular range of logical addresses. As drive capacity increases, heterogeneous applications (e.g., virtual machines) may need such selective erase functions. Accordingly, arrangements described herein relate to systems, apparatuses, methods, and non-transitory computer-readable media that allow selective erasure of all data, including ephemeral data in invalid pages in an SSD. The data, including ephemeral data in invalid pages, corresponds to a particular logical address or a particular range of logical addresses within a volume or namespace of an SSD.

Typically, a controller of an SSD maintains a mapping of logical addresses/locations (e.g., LBAs) to where data is stored in physical addresses (e.g., physical page addresses) via a suitable mapping table known as a logical to physical (L2P) mapping table. The arrangements disclosed herein relate to modifying the L2P mapping table or adding a new mapping table to map (e.g., maintain a mapping of) a logical address to invalid pages corresponding to the logical address, in addition to mapping the logical address to valid pages. The invalid pages are pages that contain outdated or invalidated data corresponding to the logical address, where such outdated or invalidated data has not been erased yet. In alternative arrangements, page metadata for each block can be written at the time the data is written such that metadata with respect to each page in each block contains a reverse pointer that points to a logical address each page originally belongs when it was first written and valid. By reading a page and checking the L2P table with this metadata (logical address), the controller can determine whether this logical address still points to the physical address of the page (in which case the data is valid) or another page address (in which case the data in this page is invalid as it has been updated and the updated data stored in another page elsewhere).

To assist in illustrating certain aspects of the present implementations, FIG. 1 shows a block diagram of a system 100 including a host 130 and an SSD 110, according to some implementations. In some examples, the host 130 may be a user device operated by a user. In that regard, the host 130 may include an OS, which is configured to provision a filesystem and applications which use the filesystem. The filesystem is configured to communicate with the SSD 110 (e.g., a controller 112 of the SSD 110) over a suitable wired or wireless communication link or network (not shown) to manage storage of data and perform selective erase of data stored in the SSD 110. In particular, the filesystem of the host 130 is configured to send a selective erase command corresponding to erasing all data, including any invalid data, mapped to a particular logical address or a particular range of logical addresses in the manner described. In some examples, the filesystem of the host 130 is configured to receive a selective erase command response from the SSD 110 in the manner described. In that regard, the host 130 includes suitable communication link or network device configured to send data to and receive data from the SSD 110.

In some examples, the host 130 and the SSD 110 reside in a datacenter (not shown for brevity). The datacenter includes a plurality of platforms, each of which supports a plurality of hosts (such as but not limited to, the host 130) and SSD devices (such as but not limited to, the SSD 110). The platforms may include computer nodes with internal storage, Just a Bunch Of Flash (JBOF) as storage nodes, or both. In some examples, the platforms may correspond to at least one rack or pod populated with a plurality of computing nodes (running virtual machine environments, OSs and applications), a plurality of storage nodes (maintaining data), or a combination thereof. The computing nodes can run virtual machine environments such as VMWare, OSs such as Microsoft Windows and Linux and applications such as Non-Structured Query Language (NoSQL) database servers. The storages can include Non-Volatile Memory (NVM) devices that maintain data, typically NAND flash memory, but examples of other non-volatile memory technologies include but are not limited to, Magnetic Random Access Memory (MRAM), Phase Change Memory (PCM), Ferro-Electric RAM (FeRAM) or the like. Regardless of whether the platform employs a computer nodes architecture, a JBOF architecture, or both, the platform can serve one or more applications with a given workload using the SSD devices.

In some implementations, the SSD devices within a platform are connected to a Top of Rack (TOR) switch and can communicate with each other via the TOR switch or another suitable intra-platform communication mechanism. In some implementations, at least one router may facilitate communications among the SSDs in different platforms, racks, or cabinets. The at least one router may facilitate communications between the SSD 110 and the host 130 and/or external entities (e.g., users).

The SSD 110 includes the controller 112, a volatile storage 116, and a non-volatile storage 118. As shown, the non-volatile storage 118 includes NAND flash memory devices 120*a*-120*n*. The NAND flash memory devices 120*a*-120*n* comprise flash memory. For example, each of the NAND flash memory devices 120*a*-120*n* includes one or more individual NAND flash dies, which are NVMs capable of retaining data without power. Thus, the NAND flash memory devices 120*a*-120*n* refer to a plurality of NAND flash memory devices or dies within the SSD 110. Each of the NAND flash memory devices 120*a*-120*n* includes a die which has one or more planes. Each plane has multiple blocks, and each block has multiple pages. Data may be written to the pages in a block in consecutive order, once all the pages are written no more data is written until the block is erased, whereupon the pages may be written with new data in consecutive order again, and so on.

The controller 112 can combine raw data storage in the plurality of NAND flash memory devices 120*a*-120*n* such that those NAND flash memory devices 120*a*-120*n* function like a single storage. The controller 112 can include microcontrollers, buffers, error correction functionality, Flash Translation Layer (FTL) and flash interface modules, software, and firmware for implementing such functions. In some arrangements, the software/firmware can be stored in the non-volatile storage 118 or in any other suitable computer readable storage medium.

The controller 112 includes suitable processing and memory capabilities for executing functions described herein, among other functions. As described, the controller 112 manages various features for the NAND flash memory devices 120a-120n including, but not limited to, I/O handling, reading, writing, erasing, monitoring, logging, error handling, garbage collection, wear leveling, logical to physical address mapping, and the like. Thus, the controller 112 provides visibility to the NAND flash memory devices 120a-120n and FTLs associated thereof.

The controller 112 (e.g., a FTL interface module) can process a L2P mapping table 122, which may be held in volatile storage 116 and non-volatile storage 118 to be written to and read from by the controller 112. The L2P mapping table 122 is a mapping table that keeps records of the correspondence between logical addresses and physical addresses. For example, the L2P mapping table 122 can translate read and write commands (received from the host 130) with respect to logical blocks into low-level commands that reference physical blocks. In some examples, a read or write command received from the host 130 includes at least a LBA. The LBA is a logical address that identifies a logical block, which may be a region in a sector. In some examples, the write command may also include a number of regions/sectors to which the data is to be written. The L2P mapping table 122 stores mapping between each logical address and one or more physical addresses (e.g., pages) where valid and current data of the logical address is stored.

The controller 112 (e.g., the FTL interface module) can perform L2P operations based on the L2P mapping table 122. For example, the controller 112 can translate a LBA into a physical address, thus resolving the physical address corresponding to the LBA. Responsive to receiving a write or read command (containing a LBA therein) from the host 130, the controller 112 (e.g., the FTL interface module) can look up the physical address corresponding to the LBA by using the L2P mapping table 122 in order to write to or read from the physical address.

In some arrangements, the L2P mapping table 122 is modified or configured to store mapping between each logical address and one or more physical addresses of memory pages) where any currently valid and invalid, out-of-date, or historic data (if any) of the logical address is stored. Pages that store the invalid, out-of-date, or historic data of a logical address are referred to herein as "invalid pages." For example, responsive to receiving a write command to update data originally stored in a first page, the controller 112 writes the updated data to a second page different from the first page. The controller 112 is configured to update the L2P mapping table 122 by adding a physical address to indicate that the updated data is stored in the second page (the new physical location). In some arrangements it may also mark the original data (the first page) as invalid by setting a validity status bit included with the physical address of the original first page in the L2P Mapping Table. In some examples, the L2P mapping table 122 is configured to store the mapping between each logical address and previously valid but now invalid page(s) corresponding to each logical address, in addition to the mapping between each logical address and valid page(s) corresponding to each logical address. In another example, responsive to receiving a trim, deallocate or unmap command to invalidate data originally stored in a first page, the controller 112 is configured to update the L2P mapping table 122 to indicate that data stored in the first page is invalid, for example in some arrangements by setting a validity status bit.

Alternatively, the L2P mapping table 122 stores the mapping between each logical address and valid page(s) corresponding to each logical address and does not store the mapping between each logical address and invalid page(s) corresponding to each logical address. Instead, a separate mapping table such as an invalid page table 123 is configured to store the mapping between each logical address and invalid page(s) corresponding thereto.

In some arrangements, the L2P mapping table 122 is modified or configured to store mapping between each logical address and either a single physical address (e.g., address of a memory page) with indication that the address contains valid or invalid data, or a pointer to an Invalid Page Table 123 which is list of physical addresses where the first entry in the list is the address of a memory page that may contain valid or invalid data, and any remaining entries in the list are addresses of memory pages that contain invalid data. In other arrangements, a validity bit may be included with the physical address In some arrangements, the L2P mapping table 122 (and the invalid page table 123, if any) may be stored in a designated location or address of the non-volatile storage 118, which may or may not be located in one of NAND flash memory devices 120a-120n. The L2P mapping table 122 (and the invalid page table 123, if any) may be loaded (cached) into the volatile storage 116 or a suitable local memory of the controller 112 when reading and updating the L2P mapping table 122 (and the invalid page table 123, if any), given that reading and writing to the volatile storage 116 and to the local memory of the controller 112 is faster than reading from or writing to the non-volatile storage 118. Updates to the mapping table may in some examples be applied directly to the cached copy in volatile storage and later propagated to non-volatile storage 118. Updates to the L2P mapping table 122 may in other examples be first stored in a separate log (not shown) in volatile storage 116, where the log can be flushed to the L2P mapping table in volatile storage 116 and non-volatile storage 118 at a later, more convenient time (e.g., based on a maximum size of the log or a number of entries) in some examples. In other examples, the log can be flushed to the non-volatile storage 118 periodically based on a timer. In other examples, the log can be flushed following a shutdown event, either planned or unexpected due to a sudden loss of power. The log may be created, updated, or modified in the volatile storage 116 or the local memory of the controller 112 during processing of write, de-allocate, trim or unmap commands received from the host 130.

In some arrangements, after the invalid pages (e.g., the blocks on which the invalid pages reside) are erased, the corresponding entries in the table 122 or 123 that stores the mapping to the invalid pages are erased in the volatile storage 116/the local memory of the controller 112 as well as in the non-volatile storage 118. In other words, after the blocks containing the invalid pages have been recycled, the changes to the table 122 or 123 made in the log of the volatile storage 116/the local memory of the controller 112 are flushed to non-volatile storage 118 to assure that there is no forensic audit trail of which invalid pages have been erased.

In some arrangements, the volatile storage 116 may be a local memory of the controller 112. In some arrangements, the volatile storage 116 may be a memory device different from or in addition to the local memory of the controller 112. Examples of the volatile storage 116 include but are not limited to, Random Access Memory (RAM), Dynamic Random Access Memory (DRAM), and Static Random Access Memory (SRAM).

The host 130 accesses the SSD 110, for example, by sending write and read commands to the SSD 110. The host 130 can communicate with the SSD 110 via a suitable interface such as but not limited to, a Universal Serial Bus (USB) interface, a Serial-Advanced Technology Attachment (SATA) interface, an Enhanced Small Disk Interface (ESDI), a Small Component Small Interface (SCSI), a Peripheral Component Interconnection (PCI) interface, an express Serial Attached SCSI (SAS), an Integrated Drive Electronics (IDE) interface, and a Non-Volatile Memory Express (NVMe) interface.

Figure 2:
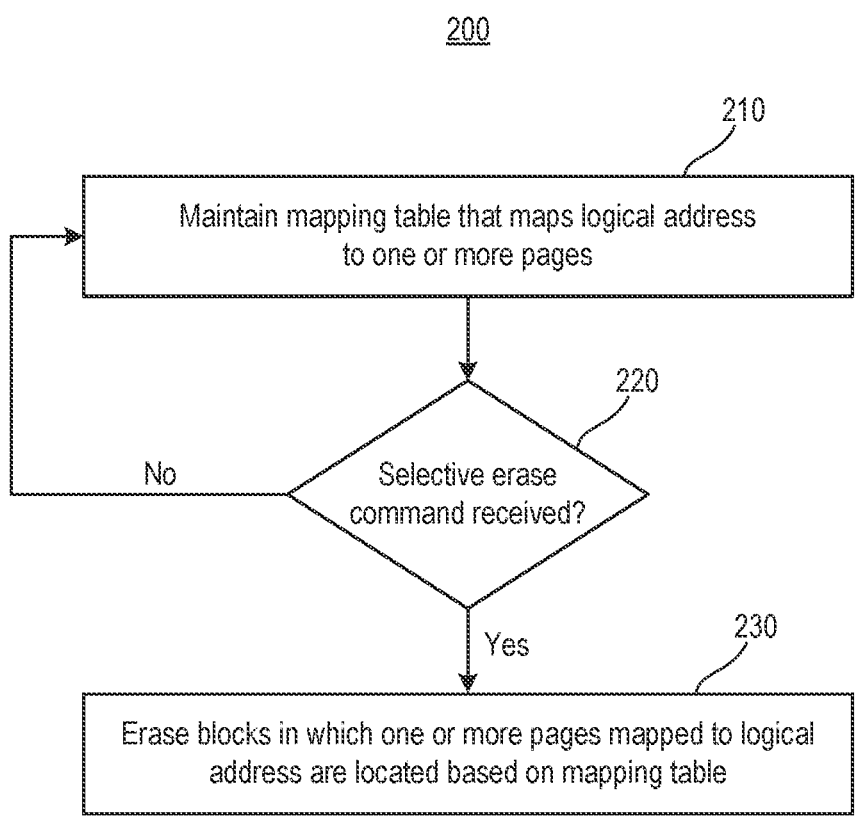
FIG. 2 shows a flow chart of an example process for managing erasure of data in a SSD, according to some implementations.

FIG. 2 shows a flow chart of a process 200 for managing selective erase in the SSD 110, according to some implementations. Referring to FIG. 2, the process 200 provides a selective erase function that erases blocks in which pages mapped to by a particular logical address reside. While pages for a logical address is described, pages mapped to by a range of logical addresses can be selectively erased in a similar fashion (e.g., each of the range of logical addresses can be selectively erased using the process 200). A logical address may map to one or more pages containing valid data, one or more pages containing invalid data, or two or more pages with at least one containing valid data and at least one containing invalid data.

At 210, the controller 112 maintains a mapping table that maps each logical address to one or more pages of the NAND flash memory devices 120a-120n of the SSD 110. Such a mapping table can be the L2P mapping table 122 (a modified version of the traditional L2P mapping table 122) that stores mapping between each logical address to one or more invalid pages in addition to storing mapping between each logical address to valid pages. Alternatively, such a mapping table can be the invalid page table 123, such that the L2P mapping table 122 only needs to maintain the mapping information for valid pages.

Figure 3:
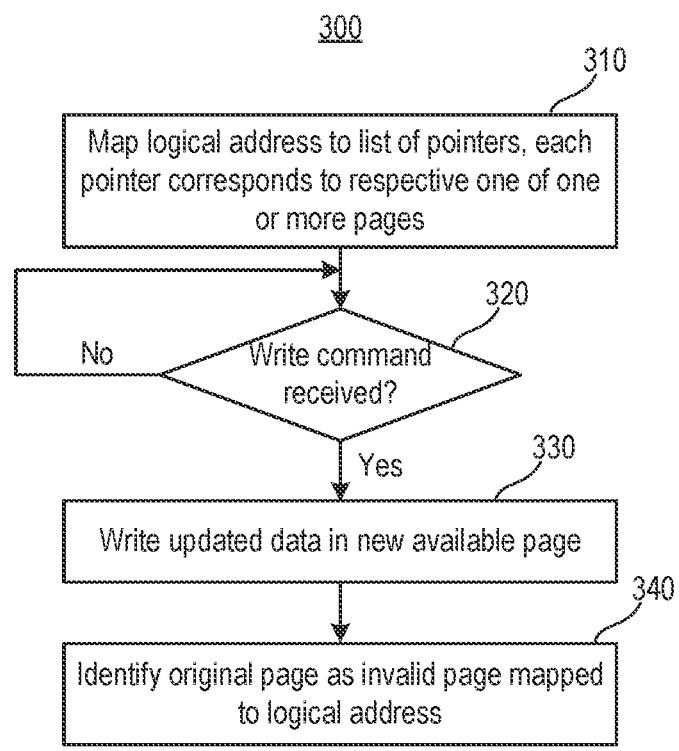
FIG. 3 shows a flow chart of an example process for maintaining a mapping table that maps each logical address to one or more pages in a SSD, according to some implementations.
Figures 4A, 4B:
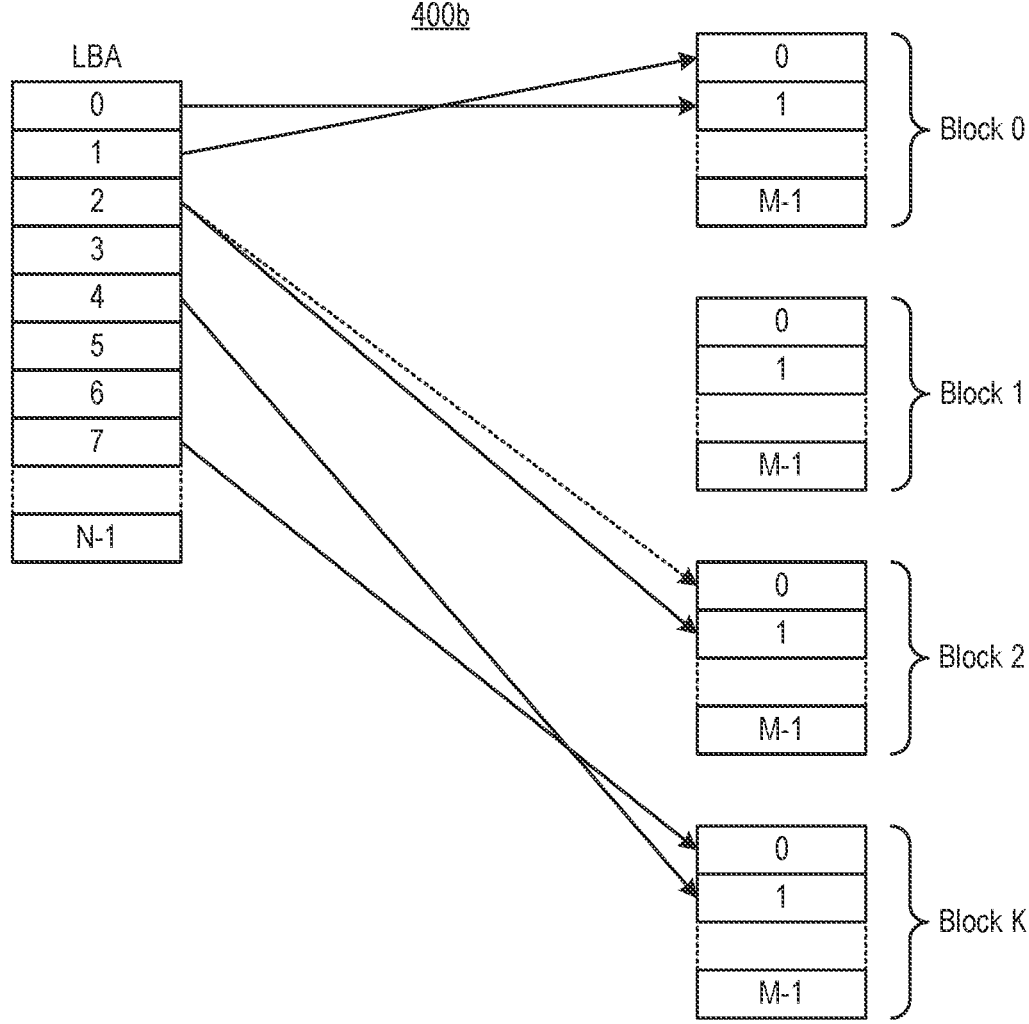
FIG. 4A shows an example block metadata for a block, according to some implementations.
FIG. 4B shows an example mapping table that maps each logical address to valid and invalid pages, according to some implementations.

FIG. 3 is an example implementation of block 210 and shows a flow chart of a process 300 for maintaining a mapping table that maps each logical address to pages in the SSD 110, according to some implementations. FIG. 4A shows block metadata 400a for a block, according to some implementations. FIG. 4B shows a mapping table 400b that maps each logical address to valid and invalid pages, according to some implementations. Referring to FIGS. 1-4B, the block metadata 400a or the mapping table 400b can be the invalid page table 123 in some examples. In some examples, the mapping table 400b can be the L2P mapping table 122.

At 310, the controller 112 maps a logical address to a list of pointers (physical addresses). Each of the list of pointers corresponds to a respective one of valid and invalid pages. As shown in the block metadata 400a for a particular block, in addition to providing a flag identifier with respect to each page that indicates whether that page is valid, invalid, or free, the block metadata 400a further includes a reverse pointer that points to a logical address (e.g., LBA(2)) for each page, if any. As shown, for an invalid page such as page(0), the block metadata 400a includes a reverse pointer that points to LBA(2). For a valid page such as page(1), the block metadata 400a includes a reverse pointer that points to LBA(2). Page(M−1) is free, therefore is not associated with a logical address. Once the block (Block 2) is erased, the reverse pointers to logical addresses for each page is updated (e.g., removed from the block metadata 400a).

In addition to or alternatively to using the block metadata 400a to keep track of invalid pages and corresponding logical addresses, the mapping table 400b can be used. As shown in the mapping table 400b, logical address LBA(2) is mapped to a list of pointers that points to page(0) and page(1) of Block 2. Page(0) is invalid and page(1) is valid. Therefore, the controller 112 maintains the mapping table 400b by marking a page corresponding a logical address as invalid by adding a flag to the pointer to indicate that the physical address contains valid data, invalid data or is free (erased and not yet written with valid data). Once the block (Block 2) is erased, the mapping from logical addresses to valid and invalid pages is updated (e.g., removed by deleting the list of pointers mapped to by the logical address).

At 320, the controller 112 determines whether a write command has been received from the host 130. The write command identifies a logical address and corresponds to updating first data originally stored in an original (first) page. Before the write command is received, the first data is valid and current, and the first page is a valid page for that logical address.

Responsive to determining that such write command has not been received (320:NO), the method 300 returns to block 320. On the other hand, responsive to determining that such write command has been received (320:YES), the controller 112 writes updated data (e.g., the updated first data) in a new available page (e.g., a second page), at 330. The second page is different from the first page.

The mapping table (e.g., the L2P mapping table 122) that maps the logical address to valid pages is updated to reflect that the second page is now storing the updated and current data for that logical address. For example, a pointer corresponding to the second page is added to the L2P mapping table 122 as a valid page for that logical address.

At 340, the controller 112 identifies the original (first) page as an invalid page mapped to the logical address, for example, using the block metadata 400a or the mapping table 400b. For example, responsive to receiving a write command (e.g., at 320) that updates data originally stored in page(0) of Block 2, the controller 112 is configured to write the updated data in page(1) of Block 2 (e.g., at 330). At 340, in some examples in which the block metadata 400a is implemented, page(0) is set to be invalid and page(1) is set to be valid, and both pages are mapped to LBA(2) using reverse pointers. Accordingly, the block metadata 400a is updated every time data is updated. At 340, in some examples in which the mapping table 400b is implemented, a pointer that maps LBA(2) to valid page(1) is set, and a pointer that maps LBA(2) to invalid page(0) is also set. Accordingly, every time data is updated, pointer(s) corresponding to one or more invalid pages are added to the mapping table 400b such that the controller 112 can keep track of both valid and invalid pages corresponding to a logical address.

Returning to FIG. 2, at 220, the controller 112 determines whether a selective erase command has been received from the host 130. The selective erase command includes at least a logical address (e.g., a LBA) or otherwise identifies the logical address. In some examples, the host 130 sends the selective erase command to the SSD 110 (the controller 112) periodically. In some examples, the host 130 sends the selective erase command to the SSD 110 (the controller 112) responsive to user input received by the host 130. In some examples, the host 130 sends the selective erase command to the SSD 110 (the controller 112) for a logical address responsive to any user or host system activity that necessitates erasure of data (for example, deletion of files in a filesystem).

Responsive to determining that the selective erase command has not been received (220:NO), the method 200 returns to block 210.

On the other hand, responsive to determining that a selective erase command has been received (220:YES), the controller 112 is configured to erase blocks in which one or more pages mapped to by the logical address are located based on the block metadata 400a or the mapping table 400b, at 230. For example, the controller 112 looks up the logical address (contained in the selective erased command received) in the block metadata 400a or the mapping table 400b to identify the one or more pages. In one example, responsive to receiving LBA(2) as the logical address in a selective erase command, the controller 112 is configured to look up the block metadata 400a or the mapping table 400b to identify page(0) and page(1) in Block 2. The controller 112 then identifies the blocks (e.g., Block 2) in which the one or more pages are located.

As described, the block metadata 400a or the mapping table 400b can be stored in the volatile storage 116/the local memory of the controller 112 and the non-volatile storage 118. The versions of the block metadata 400a or the mapping table 400b stored in both the volatile storage 116/the local memory of the controller 112 and the non-volatile storage 118 are considered. The output (e.g., the pages mapped to by the logical address) from the block metadata 400a or the mapping table 400b stored in the volatile storage 116/the local memory of the controller 112 and the output from the block metadata 400a or the mapping table 400b stored in the non-volatile storage 118 are aggregated (combined, with redundant results removed). The aggregated set of pages (the blocks on which aggregated set of pages reside) are erased.

Valid data/pages from the blocks that are to be erased that are not mapped to by the logical address are copied to other blocks before the blocks are erased. In some examples, the controller 112 is configured to send a selective erase command response to the host 130 in response to determining that the blocks are erased.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storages, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A method for managing a Solid-State Drive (SSD), comprising:
   receiving, by a controller of the SSD from a host, a selective erase command, wherein the selective erase command includes a logical address of data stored in the SSD; and
   in response to receiving the selective erase command, erasing blocks that are identified using the logical address included in the selective erase command, such that receipt of the selective erase command results in the blocks being erased by the controller in an erase operation that is performed independently of a garbage collection operation and a sector or volume erase operation.

2. The method of claim 1, further comprising
   identifying, by the controller, the blocks in which one or more pages specified by the logical address that is included in the selective erase command are located based on a mapping table that maps the logical address to the one or more pages, wherein valid data, or invalid data, or both valid data and invalid data are physically stored in the one or more pages; and
   maintaining, by the controller, the mapping table that maps the logical address to the one or more pages.

3. The method of claim 2, wherein
   maintaining the mapping table comprises mapping the logical address to a list of physical addresses; and
   each of the list of physical addresses corresponds to a respective one of the one or more pages.

4. The method of claim 3, wherein maintaining the mapping table comprises marking a page as invalid by marking a physical address corresponding to the page in the list of physical addresses as containing invalid data.

5. The method of claim 4, wherein maintaining the mapping table comprises:
   receiving a write command corresponding to updating first data at a first logical address mapped to a first page;
   in response to receiving the write command, writing updated first data to a second page;
   adding a second physical address corresponding to the second page to the list of physical addresses; and
   marking the first page as invalid.

6. The method of claim 2, wherein erasing the blocks in which the one or more pages mapped to by the logical address are located based on the mapping table comprises:
   identifying the one or more pages by looking up the logical address in the mapping table;
   identifying the blocks in which the one or more pages are located;
   identifying pages in the blocks which contain valid data other than the one or more pages;
   copying the pages in the blocks which contain valid data to new blocks; and
   executing an erase command on each of the blocks in which the one or more pages mapped to the logical address are located.

7. The method of claim 2, wherein the mapping table comprises a Logical-to-Physical (L2P) mapping table that maps the logical address to one or more invalid pages in addition to mapping the logical address to one or more valid pages.

8. The method of claim 2, wherein the mapping table comprises block metadata.

9. The method of claim 1, wherein the logical address is a logical block address (LBA).

10. The method of claim 1, wherein
    the selective erase command corresponds to erasing data mapped to a range of logical addresses; and
    the range of logical addresses comprises at least the logical address and one or more additional logical addresses.

11. The method of claim 10, further comprising sending a selective erase command response to the host in response to each of the blocks in which the one or more pages mapped to the logical address are located being erased.

12. The method of claim 1, wherein the selective erase command identifies the logical address.

13. A Solid State Drive (SSD), comprising:
    a non-volatile memory; and
    a controller configured to:
       receive, from a host, a selective erase command, wherein the selective erase command includes a logical address of data stored in the SSD; and
       in response to receiving the selective erase command, erase blocks that are identified using the logical address included in the selective erase command, such that receipt of the selective erase command results in the blocks being erased by the controller in an erase operation that is performed independently of a garbage collection operation and a sector or volume erase operation.

14. The SSD of claim 13, wherein the controller is further configured to:
    identify the blocks in which one or more pages specified by the logical address that is included in the selective erase command are located based on a mapping table that maps the logical address to the one or more pages, wherein valid data, or invalid data, or both valid data and invalid data are physically stored in the one or more pages; and maintain the mapping table that maps the logical address to the one or more pages by mapping the logical address to a list of physical addresses, wherein each of the list of physical addresses corresponds to a respective one of the one or more pages.

15. The SSD of claim 14, wherein the controller is configured to maintain the mapping table by marking a page as invalid by marking a physical address corresponding to the page in the list of physical addresses as containing invalid data.

16. The SSD of claim 15, wherein the controller is configured to maintain the mapping table by:
receiving a write command corresponding to updating first data at a first logical address mapped to a first page;
in response to receiving the write command, writing updated first data to a second page;
adding a second physical address corresponding to the second page to a list of physical addresses mapped to by the first logical address; and
marking the first page as invalid.

17. The SSD of claim 14, wherein the controller is configured to erase the blocks in which the one or more pages mapped to by the logical address are located by:
identifying the one or more pages by looking up the logical address in the mapping table;
identifying the blocks in which the one or more pages are located;
identifying pages in the blocks which contain valid data other than the one or more pages;
copying the pages in the blocks which contain valid data to new blocks; and
executing an erase command on each of the blocks in which the one or more pages mapped to the logical address are located.

18. A non-transitory computer-readable medium storing computer-readable instructions, such that when executed, causes a controller of a Solid State Drive (SSD) to:
receive, from a host, a selective erase command, wherein the selective erase command includes a logical address of data stored in the SSD; and
in response to receiving the selective erase command, erase blocks that are identified using the logical address included in the selective erase command, such that receipt of the selective erase command results in the blocks being erased by the controller in an erase operation that is performed independently of a garbage collection operation and a sector or volume erase operation.

19. The non-transitory computer-readable medium of claim 18, wherein
the controller is further configured to:
identify blocks in which one or more pages specified by the logical address that is included in the selective erase command are located based on a mapping table that maps the logical address to the one or more pages, wherein valid data, or invalid data, or both valid data and invalid data are physically stored in the one or more pages; and
maintain the mapping table that maps the logical address to the one or more pages by mapping the logical address to a list of physical addresses, wherein each of the list of physical addresses corresponds to a respective one of the one or more pages.

20. The non-transitory computer-readable medium of claim 19, wherein the controller is configured to maintain the mapping table by:
receiving a write command corresponding to updating first data at a first logical address mapped to a first page;
in response to receiving the write command, writing updated first data to a second page;
adding a second physical address corresponding to the second page to the list of physical addresses; and
marking the first page as invalid.

* * * * *